(12) United States Patent
Ziauddin et al.

(10) Patent No.: US 10,776,363 B2
(45) Date of Patent: Sep. 15, 2020

(54) EFFICIENT DATA RETRIEVAL BASED ON AGGREGATE CHARACTERISTICS OF COMPOSITE TABLES

(71) Applicant: Oracle International Corporation, Redwood Shores, CA (US)

(72) Inventors: Mohamed Ziauddin, Pleasanton, CA (US); Andrew Witkowski, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 444 days.

(21) Appl. No.: 15/638,226

(22) Filed: Jun. 29, 2017

(65) Prior Publication Data

US 2019/0005096 A1 Jan. 3, 2019

(51) Int. Cl.
*G06F 16/26* (2019.01)
*G06F 16/2455* (2019.01)
*G06F 3/06* (2006.01)
*G06F 16/23* (2019.01)
*G06F 16/22* (2019.01)
*G06F 16/248* (2019.01)

(52) U.S. Cl.
CPC .......... *G06F 16/2456* (2019.01); *G06F 3/064* (2013.01); *G06F 16/2282* (2019.01); *G06F 16/23* (2019.01); *G06F 16/248* (2019.01); *G06F 16/26* (2019.01)

(58) Field of Classification Search
CPC ...... G06F 16/26; G06F 16/283; G06F 16/248; G06F 16/2456; G06F 16/24544
USPC .......................................................... 707/802
See application file for complete search history.

(56) References Cited

U.S. PATENT DOCUMENTS

| 9,477,702 | B1 | 10/2016 | Ramachandran |
| 9,569,490 | B1 | 2/2017 | Kalarikal |
| 9,659,039 | B2 | 5/2017 | Ziauddin et al. |
| 2002/0029207 | A1 | 3/2002 | Bakalash |

(Continued)

OTHER PUBLICATIONS

Mukherjee, N., et al. "Distributed Architecture of Oracle Database In-memory". Proceedings of the VLDB Endowment, 2015, 12 pages.

(Continued)

*Primary Examiner* — Marcin R Filipczyk
(74) *Attorney, Agent, or Firm* — Hickman Palermo Becker Bingham LLP

(57) ABSTRACT

Techniques related to efficient data retrieval based on aggregate characteristics of composite tables are provided. A join zone map includes entries that describe data from a join relationship between a first key column of a first table and a second key column of a second table. The first table includes a dimension column. Each entry of the join zone map corresponds to a respective zone. Each zone includes contiguous data blocks that correspond to one or more second key column values. Each entry also includes a respective dimension value range of one or more dimension column values. Each dimension value range includes a respective maximum dimension value and a respective minimum dimension value. Furthermore, each entry includes a respective anti-join attribute value that indicates whether any of the one or more second key column values in a particular zone are non-null and fail to match any first key column values.

20 Claims, 9 Drawing Sheets

(56) References Cited

U.S. PATENT DOCUMENTS

| | | | |
|---|---|---|---|
| 2005/0010564 A1 | 1/2005 | Metzger | |
| 2006/0122964 A1* | 6/2006 | Yu | G06F 16/2393 |
| 2007/0233637 A1 | 10/2007 | Corvinelli | |
| 2009/0019103 A1 | 1/2009 | Tommaney | |
| 2013/0246484 A1* | 9/2013 | Stolte | G06F 16/211 |
| | | | 707/807 |
| 2015/0088812 A1 | 3/2015 | Ziauddin | |
| 2015/0286681 A1 | 10/2015 | Baer | |
| 2015/0363447 A1 | 12/2015 | Dickie | |
| 2016/0078064 A1* | 3/2016 | Sassin | G06F 16/211 |
| | | | 707/606 |
| 2016/0162548 A1 | 6/2016 | Dickie | |
| 2016/0162599 A1 | 6/2016 | Dickie | |
| 2016/0253379 A1 | 9/2016 | Ford | |
| 2017/0177667 A1 | 6/2017 | Boehme | |
| 2018/0246950 A1 | 8/2018 | Arye | |
| 2018/0260439 A1 | 9/2018 | Beier | |
| 2018/0300350 A1 | 10/2018 | Mainali | |
| 2019/0163771 A1 | 5/2019 | Kirk | |
| 2019/0236192 A1 | 8/2019 | Zou | |
| 2019/0362006 A1 | 11/2019 | Ziauddin | |

OTHER PUBLICATIONS

Abadi D. J., Madden S. R., Hachem N., ColumnStores vs. RowStores: How Different Are They Really? SIGMOD, 2008, 14 pages.

Abadi D. J., Myers D.S., DeWitt D. J., Madden S.R. Materialization Strategies in a Column-Oriented DBMS. Proceedings of ICDE, 2007, 11 pages.

Bellamkonda S., Ahmed R., et al. Enhanced Subquery Optimizations in Oracle. Proceedings of the VLDB Endowment, 2009, 12 pages.

Bello, R. G., et al. !Materialized Views in Oracle, Proceedings of the VLDB Endowment, 1998, 6 pages.

Bernstein, P. A., Chiu, D. W. Using semi-joins to solve relational queries. Journal of the ACM, 28(1), pp. 25-40, 1981.

Bloom, B. "Space/Time Trade-offs in Hash Coding with Allowable Errors". Communications of the ACM, 13(7), pp. 422-426, 1970.

Ceri, S., Negri, M., Pelagatti, G. Horizontal Data Partitioning in Database Design, SIGMOD, pp. 128-136, 1982.

A Technical Overview of Oracle Exadata Database Machine and Exadata Storage Server. Oracle White Paper, Jun. 2012 36 pages.

Kimball et al. "The Data Warehouse Toolkit: The Complete Guide to Dimensional Modeling", (2nd edition), John Wiley & Sons, Inc., New York, 2002, 449 pages.

Weininger, A. Efficient execution of joins in a star schema. SIGMOD, pp. 542-545, dated 2002, 4 pages.

Netezza Zone Maps. http://www-01.ibm.com/support/knowledgecenter/SSULQD_7.2.0/com.ibm.nz.adm.doc/c_sysadm_zone_maps.html, 2 pages, last viewed on Aug. 21, 2017.

O'Neil, P., O'Neil, B., Chen, X. Star Schema Benchmark. http://www.cs.umb.edu/~poneil/StarSchemaB.PDF, dated Jun. 5, 2009, 10 pages.

Oracle Database In-Memory. Oracle White Paper, Jul. 2015. http://www.oracle.com/technetwork/database/in-memory/overview/twp-oracle-database-in-memory-2245633.html, 43 pages.

Oracle Partitioning with Oracle Database 12c. Oracle White Paper, Sep. 2014, 16 pages.

Schneider, D. A., DeWitt, D. J. Tradeoffs in processing complex join queries via hashing in multiprocessor database machines. Proceedings of the VLDB Endowment, 1990, 12 pages.

Smart Scans Meet Storage Indexes. Oracle Magazine, May/Jun. 2011. http://www.oracle.com/technetwork/issue-archive/2011/11-may/o31exadata-354069.html, 4 pages.

Warren, H. S. Hacker's Delight, Addison-Wesley. 2002. p. 244.

IBM Netezza Data Warehouse Appliance. http://www-01.ibm.com/software/data/netezza/ , last viewed on Aug. 21, 20017, 3 pages.

Meiyyappan, U.S. Appl. No. 15/721,328, filed Sep. 29, 2017, Office Action, dated Nov. 29, 2019.

Mciyyappan, U.S. Appl. No. 15/721,328, filed Sep. 29, 2017, Notice of Allowance, dated Jun. 15, 2020.

Oracle, "Create Materialized Zonemap", Oracle Database Online Documentation 12c Release dated Aug. 4, 2017, 7 pages.

\* cited by examiner

FIG. 2

SALES 108

| SALES.ID 204 | TIME 206 |
|---|---|
| P1 | 10:03 |
| P1 | 11:01 |
| P1 | 11:17 |
| P1 | 12:04 |
| P2 | 13:45 |
| P4 | 12:25 |
| P2 | 15:08 |
| P3 | 11:32 |
| P3 | 10:59 |

Rows 1-3: ZONE 208
Rows 4-6: ZONE 210
Rows 7-9: ZONE 212

PROD 106

| PROD.ID 200 | NAME 202 |
|---|---|
| P1 | BIKE |
| P2 | SKI |
| P3 | CAP |

FIG. 3

JOIN ZONE MAP 104

| ZONE ID 300 | MINIMUM NAME VALUE 302 | MAXIMUM NAME VALUE 304 | MINIMUM TIME VALUE 306 | MAXIMUM TIME VALUE 308 | STALENESS 310 | ANTI-JOIN ATTRIBUTE VALUE 312 |
|---|---|---|---|---|---|---|
| Z1 | BIKE | BIKE | 10:03 | 11:17 | FRESH | 0 |
| Z2 | BIKE | SKI | 12:04 | 13:45 | FRESH | 1 |
| Z3 | CAP | SKI | 10:59 | 15:08 | FRESH | 0 |

FIG. 4

MODIFIED PROD TABLE 400

| PROD.ID 200 | NAME 202 |
|---|---|
| P1 | BIKE |
| P2 | SKI |
| P3 | CAP |
| P5 | BALL |

NEW KEY 402 → P5
NEW VALUE 404 → BALL

MODIFIED JOIN ZONE MAP 406

| ZONE ID 300 | MINIMUM NAME VALUE 302 | MAXIMUM NAME VALUE 304 | MINIMUM TIME VALUE 306 | MAXIMUM TIME VALUE 308 | STALENESS 310 | ANTI-JOIN ATTRIBUTE VALUE 312 |
|---|---|---|---|---|---|---|
| Z1 | BIKE | BIKE | 10:03 | 11:17 | FRESH | 0 |
| Z2 | BIKE | SKI | 12:04 | 13:45 | STALE | 1 |
| Z3 | CAP | SKI | 10:59 | 15:08 | FRESH | 0 |

FIG. 6

JOIN ZONE MAP 600

| ZONE ID 300 | MINIMUM NAME VALUE 302 | MAXIMUM NAME VALUE 304 | MINIMUM TIME VALUE 306 | MAXIMUM TIME VALUE 308 | STALENESS 310 | ANTI-JOIN ATTRIBUTE VALUE 312 | REFRESH STATE 602 |
|---|---|---|---|---|---|---|---|
| Z1 | BIKE | BIKE | 10:03 | 11:17 | FRESH | 0 | 0 |
| Z2 | BIKE | SKI | 12:04 | 13:45 | POTENTIALLY STALE | 1 | 0 |
| Z3 | CAN | SKI | 10:59 | 15:08 | STALE | 0 | 1 ← INDICATION 604 |

EFFICIENT DATA RETRIEVAL BASED ON AGGREGATE CHARACTERISTICS OF COMPOSITE TABLES

FIELD OF THE DISCLOSURE

Embodiments relate to information retrieval technology and, more specifically, to efficient data retrieval based on aggregate characteristics of composite tables.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Typically, data is maintained in a storage that is accessible to a server computing device. Referring to FIG. 1, storage 102 may be a data warehouse, a database, a repository, and/or any other data store. Storage 102 may include one or more disks, cards, and/or any other storage media. The data that is maintained in storage is typically organized as tables, such as table Prod 106 and table Sales 108.

Storage 102 is communicatively coupled to server computing device 100. Server computing device 100 may be a database server, a storage server, and/or any other computing device that processes queries. For example, server computing device 100 may receive, as input, a query from a client computing device (not shown). In response, server computing device 100 may transmit, to storage 102, an input/output (I/O) request related to the query.

Zone Maps

For efficient query processing, storage 102 may maintain data statistics for one or more tables. The data statistics may include a zone map that summarizes information in one or more sections of a table hereinafter referred to as "zones". A table that is summarized by a zone map is referred to herein as a mapped table.

A zone is a series of contiguous storage units that are contiguous within an address space, such as the set of all data blocks that fall within an address range in a file. The storage units store at least part of a logical set of data, such as a partition, an extent, and/or a segment. For example, each zone corresponds to a cluster of three rows in the mapped table provided below:

| Mapped Table |
| --- |
| 10:03 |
| 11:01 |
| 11:17 |
| 12:04 |
| 13:45 |
| 12:25 |
| 15:08 |
| 11:32 |
| 10:59 |

The zones of Mapped Table are outlined in bold. Thus, a first zone includes the values "10:03", "11:01", and "11:17"; a second zone includes the values "12:04", "13:45", and "12:25"; and a third zone includes the values "15:08", "11:32", and "10:59". In some example embodiments, zones may be of different sizes and/or of different hierarchical levels. For example, a fourth zone of Mapped Table may include the values in the first zone and the second zone.

A zone map provides summary information for each zone of the zone map's mapped table. For example, summary information for the zones of Mapped Table are provided in the basic zone map below:

| Basic Zone Map | | | |
| --- | --- | --- | --- |
| Zone ID | Minimum Value | Maximum Value | Staleness |
| Z1 | 10:03 | 11:17 | FRESH |
| Z2 | 12:04 | 13:45 | FRESH |
| Z3 | 10:59 | 15:08 | FRESH |

Each entry in the zone map corresponds to a zone and is identified by a respective zone identifier. For example, a first entry corresponds to the zone ID "Z1", a second entry corresponds to the zone ID "Z2", and a third entry corresponds to the zone ID "Z3". In some example embodiments, a mapping function may correlate each zone map entry with a respective zone. For example, the mapping function may map relationships between primary keys of Mapped Table and zone identifiers of Basic Zone Map.

Each zone map entry includes one or more aggregate characteristics for a particular zone. Aggregate characteristics may include information generated based on applying aggregate functions, such as RANGE, MAX, MIN, SUM, COUNT, or AVERAGE, to values of a table. For example, in the Basic Zone Map above, each entry stores a value range that includes a minimum value and a maximum value. This value range is an aggregate characteristic that provides a summary of column values included in each zone of Mapped Table.

Aggregate characteristics enable efficient query processing through zone pruning. In zone pruning, scanning of a zone is forgone for any zone that the aggregate characteristics show is irrelevant to a query. For example, server computing device 100 may receive the query "SELECT*FROM 'Mapped Table' WHERE value='11:01'". Server computing device 100 may have a copy of Basic Zone Map, which indicates that the query predicate may be satisfied in the first and third zones, but not in the second zone of Mapped Table. Thus, server computing device 100 may scan only the first and third zones of Mapped Table and forgo scanning the second zone to compute the query.

Zone maps are described in U.S. patent application Ser. No. 14/033,380, filed Sep. 20, 2013, the entire contents of which are incorporated herein by reference.

Stale Entries

As changes are made to underlying tables, the changes may cause information stored in a zone map for a zone to become inaccurate. For example, if the first value of Mapped Table is modified such that "10:03" is changed to "9:28", the value range of the zone map entry "Z1" would be inaccurate and cannot be relied upon for zone pruning. To avoid reliance on the value range that cannot be relied upon for purposes of zone pruning, the zone map entry "Z1" would be marked stale, for example, by changing the value in the "Staleness" column to indicate "STALE" instead of "FRESH".

A stale entry undergoes a "refresh" process, which involves, at a minimum, recomputing any information affected by a change to an underlying table. Recomputing zone map information may involve scanning one or more zones of the underlying table. For example, if the first zone map entry of Basic Zone Map is marked "STALE", server computing device 100 may scan the rows in the first zone of Table A to determine an updated value range for the first zone map entry.

Join Zone Maps

As described above, basic zone maps are useful for zone pruning based on columns in the mapped table itself. However, many queries join a mapped table with another table and filter on a column in the other table. To enable zone pruning on such a column for such queries, a join zone map may be used. A join zone map describes aggregate statistics about a column of another table based on a join relationship involving a mapped table and the other table. The other table is referred to herein as the join table with respect to the join zone map and the mapped table, and the column of the join table about which a join zone map describes aggregate statistics is referred to herein as the mapped join column. With respect to the join zone map, the mapped table and the mapped join column are referred to herein as being mapped by the join zone map.

For example, data warehouses typically contain a large fact table joined with one or more dimension tables. Referring to FIG. 2, table Sales 108 may be a fact table and table Prod 106 may be a dimension table. Join keys for expected joins between Sales 108 and Prod 106 are Prod.ID 200 and Sales.ID 204, respectively. Prod.ID 200 is a primary key of Prod 106, and Sales.ID 204 is a foreign key corresponding to a primary key of Prod 106. Performing a JOIN operation between Sales 108 and Prod 106 causes generation of the join results provided below:

| Join Results | |
|---|---|
| 10:03 | Bike |
| 11:01 | Bike |
| 11:17 | Bike |
| 12:04 | Bike |
| 13:45 | Ski |
| 12:25 | NULL |
| 15:08 | Ski |
| 11:32 | Cap |
| 10:59 | Cap |

An example of a join zone map that stores aggregates statistics on a mapped join column of the mapped table Sales 108 is shown below. The mapped join column is Name 202 of join table Prod 106.

| Join Zone Map | | | | | |
|---|---|---|---|---|---|
| Zone ID | Minimum Name Value | Maximum Name Value | Minimum Time Value | Maximum Time Value | Staleness |
| Z1 | BIKE | BIKE | 10:03 | 11:17 | FRESH |
| Z2 | BIKE | SKI | 12:04 | 13:45 | FRESH |
| Z3 | CAP | SKI | 10:59 | 15:08 | FRESH |

"Z1", "Z2", and "Z3" correspond to zones 208-212, respectively. Note that the join zone map includes the aggregate characteristic RANGE of mapped join column Name 202. For example, the minimum value of Name 202 of any row in Prod 106 that joins to any row of Sales 108 in zone Z3 is "CAP", and the maximum value of Name 202 of any row in Prod 106 that joins to any row of Sales 108 in zone Z3 is "SKI".

Join Zone Map is useful for zone pruning to compute the following example query:

Select Prod.Name, Sales.Time
From Prod, Sales
Where Prod.ID = Sales.ID and Prod.Name = "PADDLE"

Based on the join zone map, zone Z1 may be pruned, because the aggregate characteristics for its Name 202 values indicate that none of the rows in zone Z1 could satisfy the predicate condition Prod.Name="PADDLE".

If a value of Name 202 undergoes any modification, identifying stale entries of Join Zone Map may involve a computationally expensive JOIN operation. For example, if table Prod 106 is modified such that Prod.ID 200 value "P1" corresponds to Name 202 value "AIRPLANE" instead of "BIKE", it may be difficult to determine which of zones 208-212 are affected without scanning column Sales.ID 204 to determine any matches. As a result, any advantages of maintaining Join Zone Map may be outweighed by the computational overhead of performing a costly JOIN operation every time a dimension table is changed.

Orphans

Database management systems often do not declare referential integrity constraints due to the high cost of enforcing referential integrity constraints. The absence of referential integrity constraints permits the formation of certain orphan rows of a fact table. There are at least two types of orphan fact rows—real orphans and pseudo-orphans. Real orphans fail to join any rows of a dimension table, because real orphans have join key values that are NULL. On the other hand, pseudo-orphans have non-null join key values; however pseudo-orphans fail to join with any rows of a dimension table, because matching join key values are presently non-existent in the dimension table.

When there is referential integrity between a mapped table and a dimension table based on their join keys, adding a new row to the dimension table does not affect the accuracy of a join zone map. However, without such referential integrity, an existing pseudo-orphan may join with the new row, thereby affecting the accuracy of the aggregate characteristics for the zone that contains the pseudo-orphan.

For example, zone 210 of FIG. 2 includes a pseudo-orphan having Sales.ID 204 value "P4" and Time 206 value "12:25". The pseudo-orphan may be a remnant of a deleted dimension row that had Prod.ID 200 value "P4" and Name 202 value "BOBSLED". When a new dimension row having Prod.ID 200 value "P4" and Name 202 value "AIRPLANE" is added to Prod 106, the pseudo-orphan would improperly join with it. Accordingly, the join zone map would improperly indicate that the lexicographic minimum value of Name 202 for zone 210 is "AIRPLANE" when zone 210 should not even include the value "AIRPLANE". With referential integrity, the vestigial value "P4" would have never existed in Sales.ID 204, and the join zone map would have remained accurate even after the addition of the new dimension row.

It is computationally expensive to determine which zones of a join zone map will be affected by a change in a join key. As a result, the join zone map may be marked stale in its entirety until the join zone map may be re-computed.

Thus, there is a need for an approach that efficiently maintains a join zone map even when a dimension table is modified.

BRIEF DESCRIPTION OF THE DRAWINGS

In the drawings:

FIG. 2 depicts example tables.

FIG. 3 depicts an example join zone map.

FIG. 4 depicts an approach for inserting a new first key column value.

FIG. 6 depicts an example join zone map that includes refresh state information.

Figure 1:
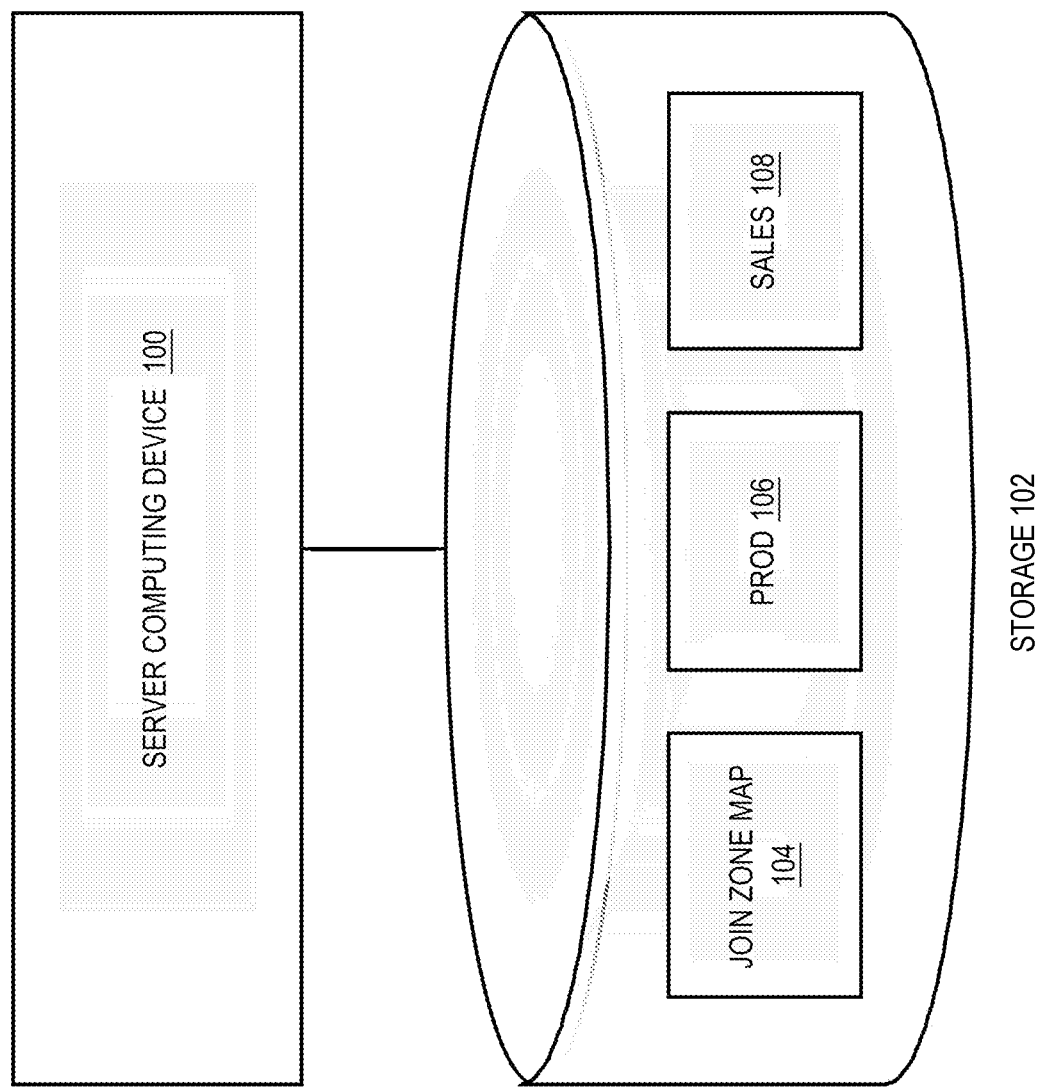
FIG. 1 depicts an example computer architecture on which embodiments may be implemented.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

General Overview

As mentioned above, a join zone maps tracks aggregate characteristics for a mapped join column and a mapped table. Join zone maps are useful for dimension tables and fact tables, where the mapped table is a fact table and the mapped join column is a column of a dimension table. For purposes of exposition, the terms fact table, dimension table, and dimension column are treated as being synonymous with a mapped table, join table, and mapped join column with respect to a join zone map to which the mapped table, join table, and mapped join are mapped. However, an embodiment of the present invention is not limited to dimension tables and fact tables.

When a new row is added to a dimension table mapped by a join zone map, any zone with a pseudo-orphan may not be reliable for zone pruning purposes, as shall be explained in greater detail. Accordingly, a database server includes, in a set of zero or more candidate entries to be marked as "Stale", any join zone map entry for a zone with a pseudo-orphan. Zones without pseudo-orphans may not be marked as "Stale" in response to adding a new row. Recomputation of the join zone map may be limited to zones not marked as "Fresh", thereby saving on computer resources when recomputing the join zone map. In addition, this advantage is achieved without adding significant overhead to modifications made to the dimension tables.

A zone that includes one or more pseudo-orphans may be quickly identified based on maintaining an "anti-join attribute" value for each entry of a join zone map. The attribute is referred to as such, because pseudo-orphans belong to an anti join result of a dimension table and a fact table. In some example embodiments, the anti-join attribute values may indicate a count of pseudo-orphans that may exist for a respective zone.

Other scenarios for more selectively marking the join zone map entries as "Stale" are discussed. As a result of more selectively marking join zone map entries as "Stale", a join zone map may continue to be used. The entries not marked as "Stale" may be relied upon for zone pruning.

Anti-Join Attributes

Referring to FIG. 3, join zone map 104 includes anti-join attribute value 312 for each entry. Anti-join attribute value 312 indicates whether a particular entry corresponds to a zone that includes one or more pseudo-orphans. In some example embodiments, join zone map 104 may include multiple sets of anti-join attribute values, each set indicating whether a fact table includes any pseudo-orphans relative to a different dimension table. For example, join zone map 104 may include an additional column of anti join attribute values indicating whether any non-null key values of table Sales 108 fail to match any key values of a third table (not shown).

To account for situations in which pseudo-orphans may join with dimension key values, join zone map 104 maintains anti-join attribute value 312 for each entry. In some example embodiments, anti-join attribute value 312 is a bit that indicates whether or not a particular zone includes any pseudo-orphans. For example, a database server may perform an anti-join between a dimension table and rows of a fact table that are in a zone and set a bit when the anti-join returns any rows. In some example embodiments, anti-join attribute value 312 indicates a quantity of pseudo-orphans in a particular zone.

Any join zone map entry having an anti-join attribute indicating that the zone has at least one orphan is referred to herein as being marked as having a pseudo-orphan.

Like Join Zone Map above, join zone map 104 also includes zone ID 300, minimum Name value 302, maximum Name value 304, minimum Time value 306, maximum Time value 308, and staleness 310. Zone ID 300 may correspond to unique identifiers that are used to correlate each entry to a particular zone of a fact table. Together, minimum Name value 302 and maximum Name value 304 may define a respective dimension value range based on Name 202 values included in each zone. Similarly, minimum Time value 306 and maximum Time value 308 may define a respective fact value range based on Time 206 values included in each zone.

Staleness States

Staleness 310 may indicate a respective state of each join zone map entry. For example, values of staleness 310 may include "Fresh" and/or "Stale". "Fresh" indicates that a particular entry includes information that is reliable for purposes of zone pruning. "Stale" indicates that a particular entry includes information that cannot be guaranteed to be reliable and therefore should not be relied upon for zone pruning. However, even though a join zone map entry is not in a "Stale" state and may be relied upon for zone pruning, the information therein may not be accurate. FIG. 4 is used to illustrate the concepts for reliability and accuracy.

For example, FIG. 4 depicts modified join zone map 406. If the dimension value "SKI" is removed from Name 202, then the dimension value range "BIKE-SKI" for zone Z2 is no longer accurate, because the maximum Name value 304 should now be lexicographically less than "SKI" for the zone. Nevertheless, the entry may be used for zone pruning, because it is guaranteed that there is no Name 202 value greater than "SKI" in the zone. As used herein when characterizing a zone map entry or information contained therein, the term "reliable" means the entry is reliable for purposes of zone pruning but may not be accurate.

When a join zone map entry includes information that is reliable but may or may not be accurate, the join zone map entry may be marked as "Potentially Stale" in some example embodiments. As shall be explained in greater detail below, an entry may also be marked as "Potentially Stale" when modification of a dimension table may create a pseudo-orphan in a zone. Thus marking an entry as "Potentially Stale" in effect captures pseudo-orphans created after computation of a join map table. Notably, "Potentially Stale" entries may continue to be used for zone pruning. However, "Potentially Stale" entries are recomputed as if they were "Stale" entries.

In some example embodiments, "Potentially Stale" may be an intermediate state between "Fresh" and "Stale". Thus, it can be said that a join zone map entry transitioning from "Fresh" to "Potentially Stale" is being included in a set of candidate entries to be marked as "Stale". Notably, not all join zone map entries included in the set transition from "Potentially Stale" to "Stale". Some join zone map entries marked as "Potentially Stale" may subsequently be excluded from the set of candidate entries to be marked as "Stale".

For example, not all zone map entries affected by updated data become unreliable. As used herein, updating data is equivalent to deleting the data and inserting an updated version of the data. In the previous example, "SKI" is deleted from Name 202, thereby rendering the aggregate characteristics for zone Z2 inaccurate yet reliable. Accordingly, the join zone map entry for zone Z2 would be marked as "Potentially Stale". Whether this entry becomes marked as "Stale" depends on the value that replaces "SKI". To illustrate, if "SKI" is replaced with "SLED", then the join zone map entry for Z2 would be marked as "Stale", because the range "BIKE-SKI" would become unreliable. On the other hand, if "SKI" is replaced with "PADDLE", then the join zone map entry for Z2 would not be marked as "Stale", because the range "BIKE-SKI" would remain reliable. Thus, the join zone map entry for Z2 may remain marked as "Potentially Stale".

Deleting Keys and/or Values from a Dimension Table

In general, deleting a key and/or a value from a dimension table does not render a join zone map entry unreliable. However, deleting a dimension key and/or a dimension value may affect the accuracy of information in a join zone map entry. Information that may become inaccurate includes anti-join attribute value 312 and/or aggregate characteristics. Thus, a deletion performed on a dimension table may cause one or more join zone map entries to be marked as "Potentially Stale". Such a marking may signify at least one of the following two conditions:

the deletion may have caused the dimension value range of the join zone map entry to become inaccurate; or the deletion may have caused the zone corresponding to the join zone map entry to include a pseudo-orphan.

As mentioned above, when an entry is marked as "Fresh", the entry's dimension value range and anti-join attribute value are accurate. Thus, when the accuracy of the dimension value range and/or the anti join attribute value is affected, the entry is marked as "Potentially Stale". Like "Stale" entries, "Potentially Stale" entries may benefit from a refresh process to address the possibility of an inaccurate dimension value range or the possibility that a pseudo-orphan has been created.

The first condition occurs when a value is deleted from a dimension table. As illustrated in the previous example, deleting a dimension value may affect the accuracy, but not the reliability, of a join zone map entry. More specifically, deleting "SKI" affected the accuracy, but not the reliability, of the dimension value range "CAP-SKI".

However, it is difficult to determine whether or not a particular zone includes a deleted value without performing an expensive JOIN operation. Accordingly, any join zone map entry with aggregate characteristics that can encompass the deleted value is marked as "Potentially Stale". For example, zone A, zone B, and zone C may have the dimension value ranges "BIKE-SKI", "CAR-TRUCK", and "PLANE-VAN", respectively. Even if zone A is the only zone that included the deleted value "SKI", each of zones A-C may be marked as "Potentially Stale", because each of zones A-C has a dimension value range that can encompass "SKI".

The second condition may occur when a key or a row is deleted from a dimension table. When referential integrity is not enforced, deleting a dimension key or a dimension row may result in pseudo-orphan fact rows. For example, deleting "P3" or the row including "P3" from Prod 106 may cause creation of pseudo-orphans in zone 212 of Sales 108. Having pseudo-orphans, in and of itself, does not render a join zone map entry unreliable. As discussed above, pseudo-orphans may affect reliability when dimension keys are inserted or updated, not when they are deleted.

When a pseudo-orphan is created, one or more anti join attribute values of a join zone map may require updating. However, it is difficult to determine whether or not a particular zone includes a newly formed pseudo-orphan without performing an expensive JOIN operation. Accordingly, any join zone map entry corresponding to a zone that can possibly include a newly formed pseudo-orphan corresponding to the deleted key is marked as "Potentially Stale". This is achieved based on referring to any dimension value that was deleted along with the deleted dimension key or row. For example, deleting the key "P3" may involve deleting the value "CAP". Thus, any join zone map entry with aggregate characteristics that can encompass the deleted value is marked as "Potentially Stale". For example, the entries corresponding to zones Z2 and Z3 may be marked as "Potentially Stale" even though, in reality, only zone Z3 includes the newly formed pseudo-orphan.

This approach may be used to simultaneously mark as "Potentially Stale" any join zone map entries with aggregate characteristics that have become inaccurate as a result of deleting a dimension key or a dimension row.

Although these approaches err on the side of being overly inclusive, they typically result in significant computational savings as compared to the alternative of recomputing a join zone map in its entirety.

Inserting Keys and/or Values into a Dimension Table

In contrast to deleting a dimension key and/or a dimension value, inserting a key and/or a value into a dimension table may render a zone map entry unreliable. FIG. 4 depicts modified Prod table 400, which includes new key 402. As mentioned above, pseudo-orphans may become problematic when dimension keys are inserted, because pseudo-orphans may join with the inserted dimension keys, thereby causing information in one or more join zone map entries to become inaccurate and/or unreliable. Using a join zone map, possibly affected join zone map entries may be determined based on referring to anti join attribute values instead of performing an expensive JOIN operation or scanning all foreign keys of a large fact table. Any entries corresponding to zones that have one or more pseudo-orphans may be included in a set of zero or more candidate entries to be marked as "Stale".

Referring to FIG. 4, the first and third entries of modified join zone map 406 have values of "0" under anti-join attribute value 312. Hence, the corresponding zones do not contain any pseudo-orphans. No row in these zones can join with new key 402. However, the second entry of modified join zone map 406 includes a value of "1" under anti-join attribute value 312, which indicates that there is a pseudo-orphan in zone Z2. It is possible, but not certain, that a pseudo-orphan in zone Z2 may have the value "P5" in Sales.ID 204 and thus may join with new key 402. Accordingly, the second entry is marked as "Potentially Stale", because the second entry could possibly require updating of its anti-join attribute value 312.

The set of zero or more candidate entries may be further refined based on referring to any dimension value that was inserted along with the newly inserted key. In the example of FIG. 4, a new row containing "P5" in Prod.ID 200 is inserted. The new row contains "BALL" as new value 404. In this case, the actual minimum Name value 302 for zone Z2 may become "BALL", thereby rendering the indicated minimum Name value 302 unreliable. Accordingly, the entry for zone Z2 would be marked as "Stale", because the newly inserted dimension value "BALL" lies outside the dimension value range "BIKE-SKI". In other words, if a pseudo-orphan in zone Z2 joins with new key 402, the dimension value range for zone Z2 would not accommodate new value 404 and thus become unreliable for zone pruning.

If instead, new value 404 had been "CAN", then new value 404 would have fallen within the dimension value range of "BIKE-SKI" for zone Z2. The information in modified join zone map 406 therefore would have remained reliable, and the entry for zone Z2 would not have been marked as "Stale". Rather, the entry for zone Z2 may have remained marked as "Potentially Stale". This is because even if a pseudo-orphan in zone Z2 joins with new key 402, the dimension value range for zone Z2 would accommodate new value 404 and thus remain reliable for zone pruning.

Updating Dimension Keys and/or Dimension Values

As mentioned above, updating a dimension value is similar to deleting an old dimension value and inserting a new dimension value. Thus, any join zone map entry having a dimension value range that includes the old dimension value may be marked as "Potentially Stale". Furthermore, any such "Potentially Stale" entries having a dimension value range that does not include the new dimension value may be marked as "Stale". This is true regardless of whether the zone contained pseudo-orphans.

Figure 5:
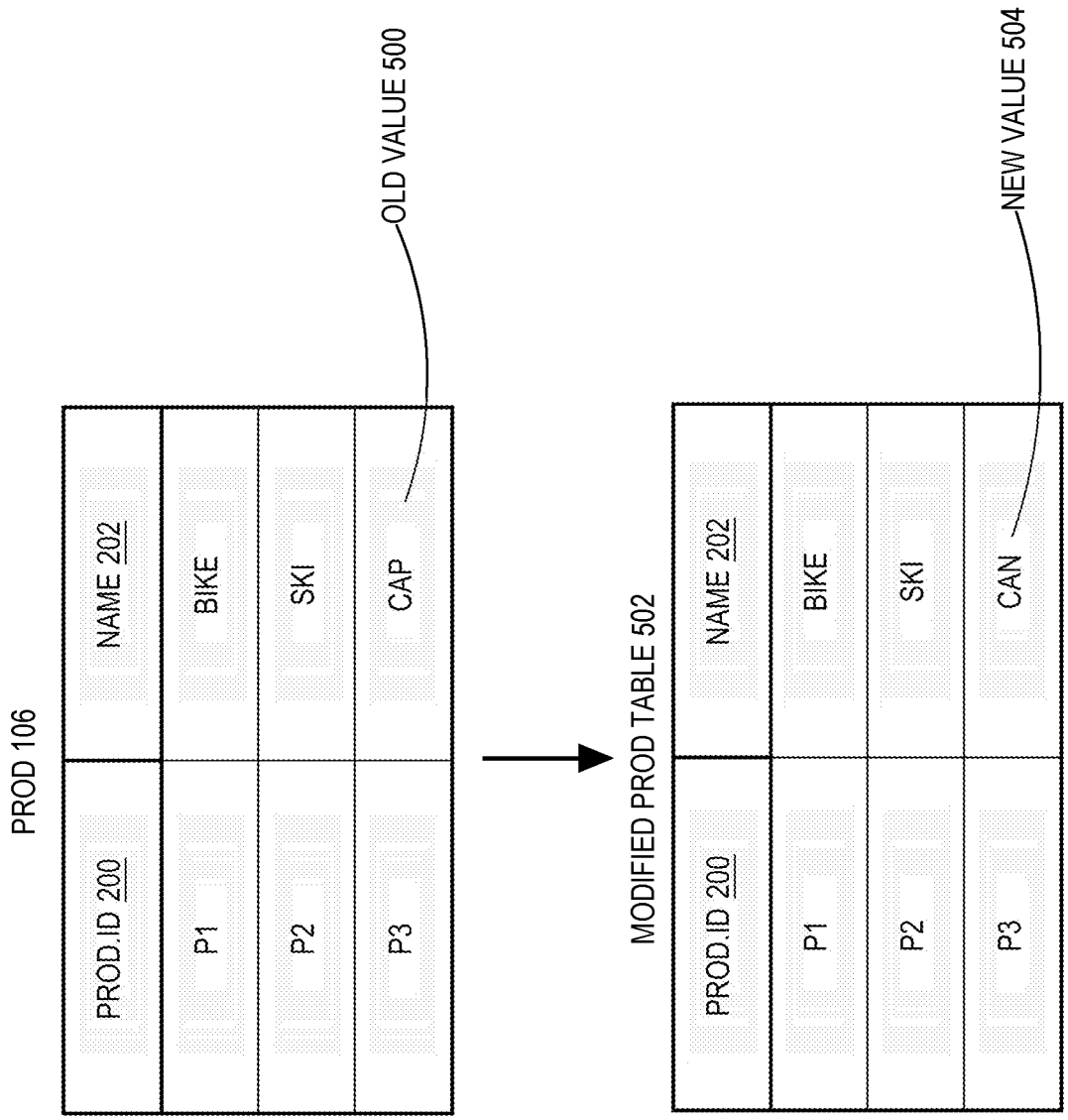
FIG. 5 depicts an approach for updating a dimension column value.

Referring to FIG. 5, table Prod 106 includes old value 500, and, after updating, modified Prod table 502 includes new value 504. In other words, "CAP" is replaced with "CAN". Join zone map 104 may be analyzed for any entries affected by deleting "CAP" and inserting "CAN".

A set of zero or more candidate entries affected by deleting a dimension value is determined based on comparing old value 500 to a respective dimension value range of each entry in join zone map 104. Any entry with a dimension value range that could contain old value 500 is included in the set of zero or more candidate entries. These entries correspond to zones that may be affected by changing old value 500. Accordingly, they are marked as "Potentially Stale".

For example, if old value 500 corresponds to "CAP", the join zone map entries for zones Z2 and Z3 have dimension value ranges that could contain old value 500. Thus, both of these entries are marked as "Potentially Stale".

The set of zero or more candidate entries is refined based on comparing new value 504 to the respective dimension value range of each candidate entry to determine which candidate entries are affected by inserting a new dimension value. Any candidate entry having a dimension value range that could contain new value 504 may be removed from the set of zero or more candidate entries, because such an entry would remain reliable. In other words, such an entry would not be marked as "Stale" but may instead remain marked as "Potentially Stale". This enables such an entry to continue to be used for zone pruning while slating it for recomputation in case any zone information has become inaccurate. However, any candidate entry having a dimension value range that cannot include new value 504 would remain in the set of zero or more candidate entries, because such an entry would be unreliable. In other words, such an entry would be marked as "Stale" and slated for recomputation.

For example, if new value 504 is "CAN", the second entry of join zone map 104 has a dimension value range that does contain "CAN". Thus, the second entry is not marked as "Stale", because its reliability is unaffected by the change. In contrast, the third entry of join zone map 104 has a dimension value range that does not contain "CAN". Thus, the third entry is marked as "Stale".

Likewise, updating a dimension key is similar to deleting an old dimension key and inserting a new dimension key. If the value of the dimension key is changed, a set of zero or more candidate entries includes any join zone map entries having at least one pseudo-orphan. Whether a particular entry has a pseudo-orphan may be determined based on an anti join attribute value and/or a dimension value range of the particular entry. For example, the set of zero or more candidate entries may include any entry having a non-zero anti-join attribute value and/or a dimension value range that could contain the dimension value that was associated with the old dimension key. In some embodiments, any such entries are marked as "Potentially Stale". The set of zero or more candidate entries may be refined based on comparing the dimension value range of the particular entry to the dimension value associated with the new dimension key. Any candidate entries having a dimension value range that can accommodate the dimension value associated with the new dimension key are excluded from the set and may remain marked as "Potentially Stale". Other candidate entries are marked as "Stale".

However, if the value of the dimension key is not changed, updating a dimension key is similar to simply updating a dimension value as discussed above.

Efficient Recomputation

As mentioned above, recomputing join zone map information involves performing a JOIN operation. However, joining a dimension table with a fact table in its entirety may be computationally expensive. To reduce computational overhead associated with recomputation, join zone map entries may be recomputed based on information stored in a join zone map. According to an embodiment, only join zone map entries that are marked as "Stale" or "Potentially Stale" are recomputed based on an approach that is analogous to zone pruning. More specifically, instead of joining a dimension table to an entire fact table, the dimension table is only joined to zones of the fact table that correspond to "Stale" or "Potentially Stale" entries. Thus, a join zone map may be used to limit how much of a fact table is joined to a dimension table during recomputation.

Concurrent Recomputation

In some example embodiments, a join zone map may include additional information about a particular zone's state. In the example of FIG. 6, join zone map 600 includes information related to refresh state 602. As mentioned above, information in "Stale" or "Potentially Stale" entries may be recomputed when the entries are refreshed. At a minimum, refresh state 602 indicates whether information in a particular entry is undergoing a refresh process.

Referring to FIG. 6, information related to refresh state 602 may include indication 604. Indication 604 signifies that the third entry of join zone map 600 is "pending refresh". However, any entries marked as "pending refresh" may concurrently undergo modification.

Although concurrently recomputating and modifying entries enables parallelization, it also poses the risk of performing a recomputation based on superseded data. For example, a particular zone's fact/dimension value range may be recomputed to be "CAN-SKI" immediately before the fact/dimension value "BIKE" is inserted into the particular zone. Advantageously, tracking such recomputations with indication 604 ensures that the recomputations are treated as unreliable.

Typically, server computing device 100 modifies tables based on processing transactions. A transaction effects one or more changes to a database based on one or more instructions that are processed as a single logical operation. For example, the Structured Query Language (SQL) commands "INSERT", "UPDATE", and "DELETE" may be processed as a single transaction. Any changes effected by a particular transaction are persisted when the particular transaction commits. A transaction that fails to commit may undergo a "rollback" operation that restores a previous version of data.

When recomputing all or part of a zone map entry is performed concurrently with processing a transaction that modifies underlying data, the zone map entry may be marked with indication 604. If the transaction commits, the zone map entry may be marked as "Stale" or "Potentially Stale". Thus, the zone map entry is slated for another recomputation. Continuing the previous example, if a transaction inserting the fact/dimension value "BIKE" into the particular zone commits, the entry corresponding to the particular zone may be marked as "Stale". However, if the transaction fails to commit, indication 604 is cleared at the end of the refresh process as if the transaction never occurred.

Process Overview

Figure 7:
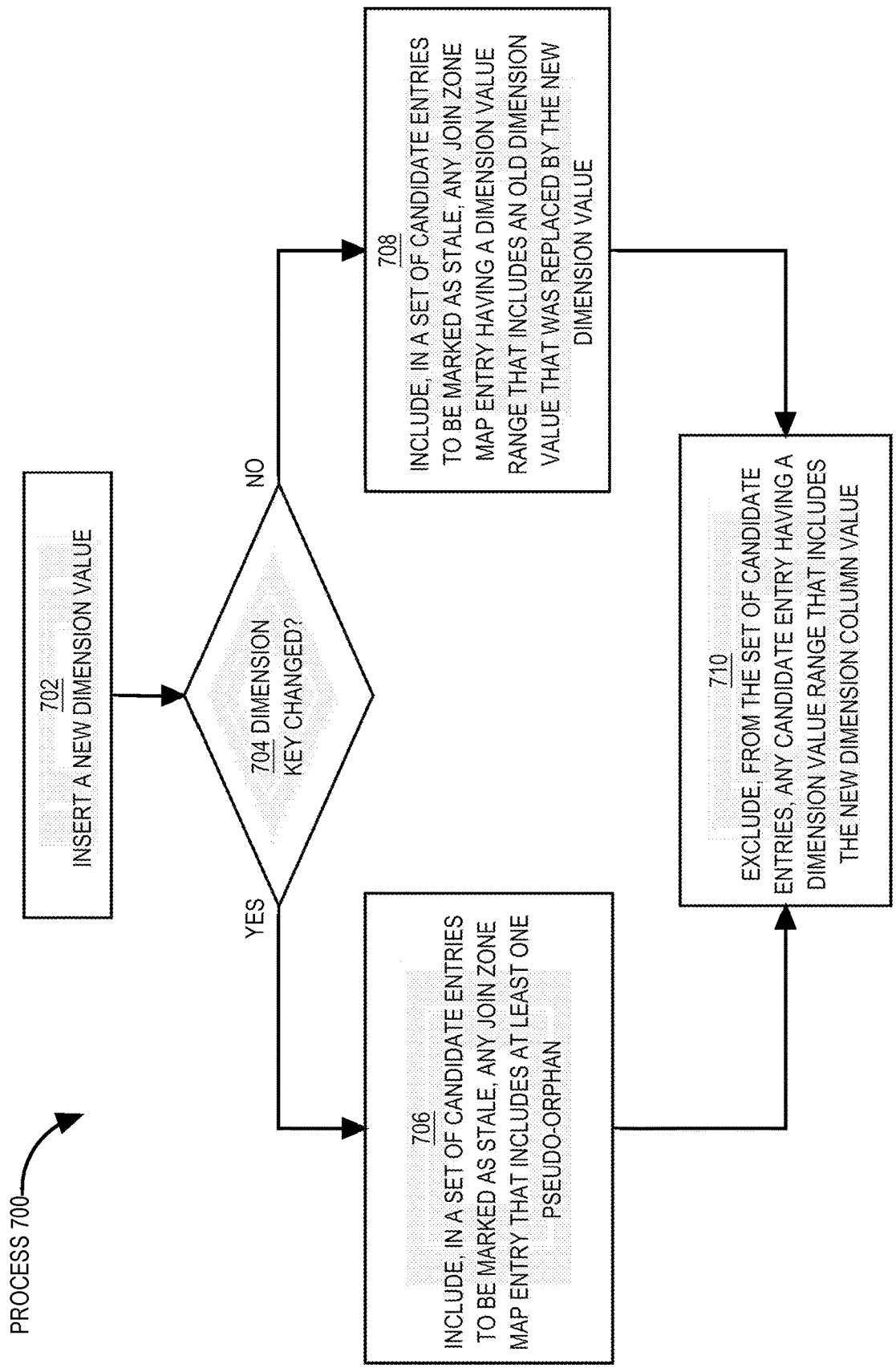
FIG. 7 is a flow diagram that depicts an approach for efficient data retrieval based on aggregate characteristics of composite tables.

FIG. 7 is a flow diagram that depicts process 700 for efficient data retrieval based on aggregate characteristics of composite tables. Process 700 may be performed by a server that stores a join zone map in a storage device, such as an array of disks. The server may generate the join zone map based on performing a JOIN operation on two or more tables, including a fact table and a dimension table. The fact table may include fact keys and fact values, and the dimension table may include dimension keys and dimension values.

The join zone map may include entries that describe data resulting from a join relationship between fact keys and dimension keys. Each entry corresponds to a respective zone that includes contiguous data blocks, such as disk blocks. Each zone may be mapped to one or more fact keys. Thus, each zone corresponds to one or more dimension values that may be correlated to the one or more fact keys based on the join relationship. The one or more dimension values may be summarized as an aggregate characteristic, such as a dimension value range that includes a minimum dimension value and a maximum dimension value.

Each entry may also include a respective anti join attribute value that indicates whether there are any pseudo-orphans in a corresponding zone. Pseudo-orphans are non-null fact keys that fail to match any dimension keys.

At block 702, the server may store a new dimension value in the dimension table. Storing the new dimension value may involve an INSERT operation or an UPDATE operation.

At block 704, the server determines whether the new dimension value is accompanied by a change in a dimension key. If so, block 704 proceeds to block 706. For example, the new dimension value may be part of a dimension row insert or dimension row update that changed a join key. Otherwise, block 704 proceeds to block 708. For example, the new dimension value may be part of a dimension row insert or dimension row update that involved the same join key.

At block 706, the server identifies a set of candidate entries to be marked as "Stale" when a dimension key was changed. The set of candidate entries includes any entry having an anti join attribute value indicating that a corresponding zone includes at least one pseudo-orphan. In some example embodiments, such entries are marked as "Potentially Stale". Block 706 may proceed to block 710.

At block 708, the server identifies a set of candidate entries to be marked as "Stale" based on different criteria. Here, a dimension key was not changed. Thus, the set of candidate entries includes any entry having a dimension value range that can accommodate an old dimension value replaced by the new dimension value. In some example embodiments, such entries are marked as "Potentially Stale". Block 708 may proceed to block 710.

At block 710, the server refines the set of candidate entries based on excluding, from the set, any candidate entry having a dimension value range that can accommodate the new dimension value. In some example embodiments, such entries remain marked as "Potentially Stale". Thus, there are at least two types of entries that are actually marked as "Stale". The first type corresponds to entries having pseudo-orphans as well as dimension value ranges that exclude the new dimension value. The second type corresponds to entries having a dimension value range that can accommodate the old dimension value and that excludes the new dimension value.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
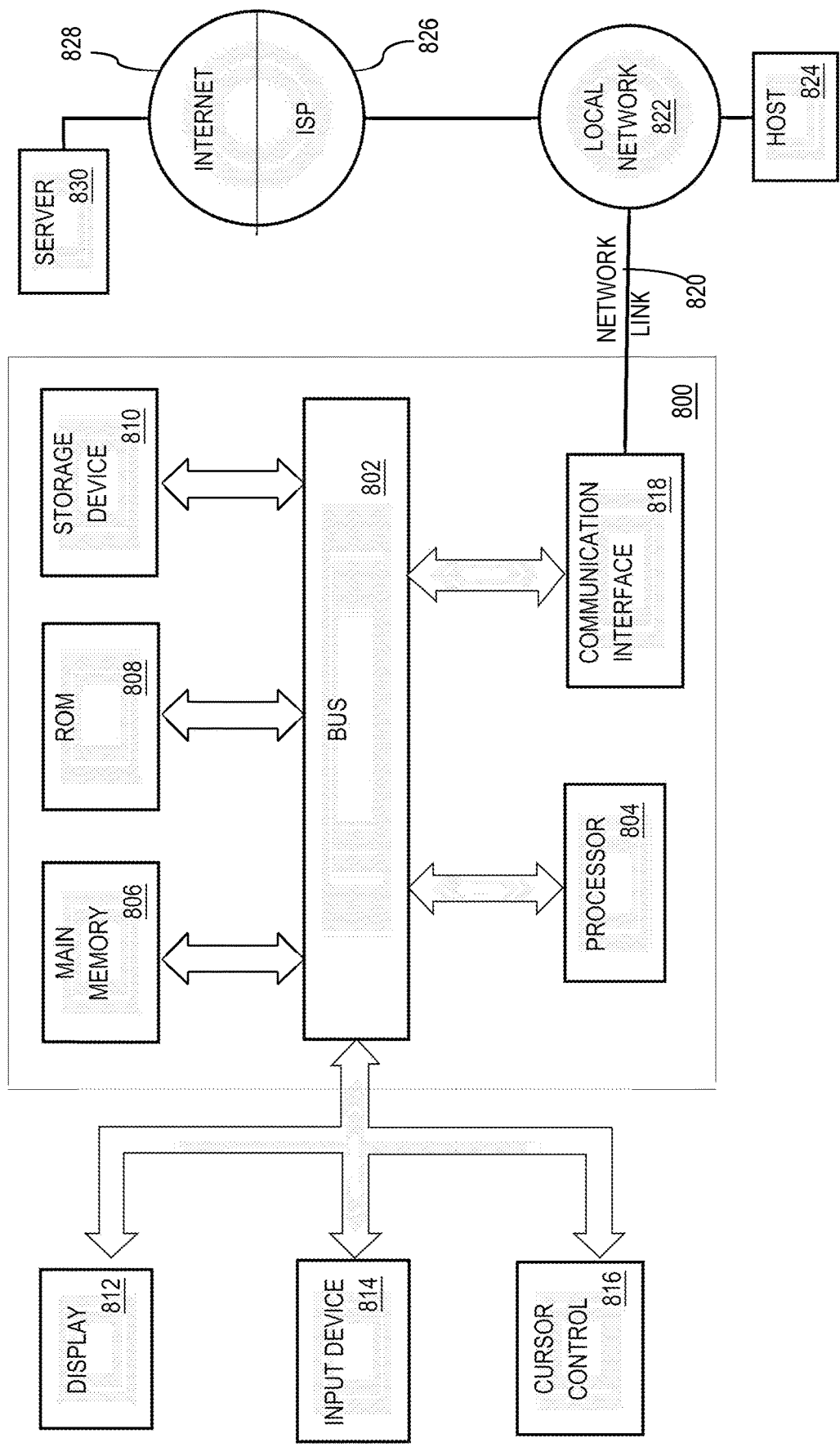
FIG. 8 depicts a computer system upon which an embodiment may be implemented.

For example, FIG. 8 is a block diagram that illustrates a computer system 800 upon which an embodiment of the disclosure may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Software Overview

Figure 9:
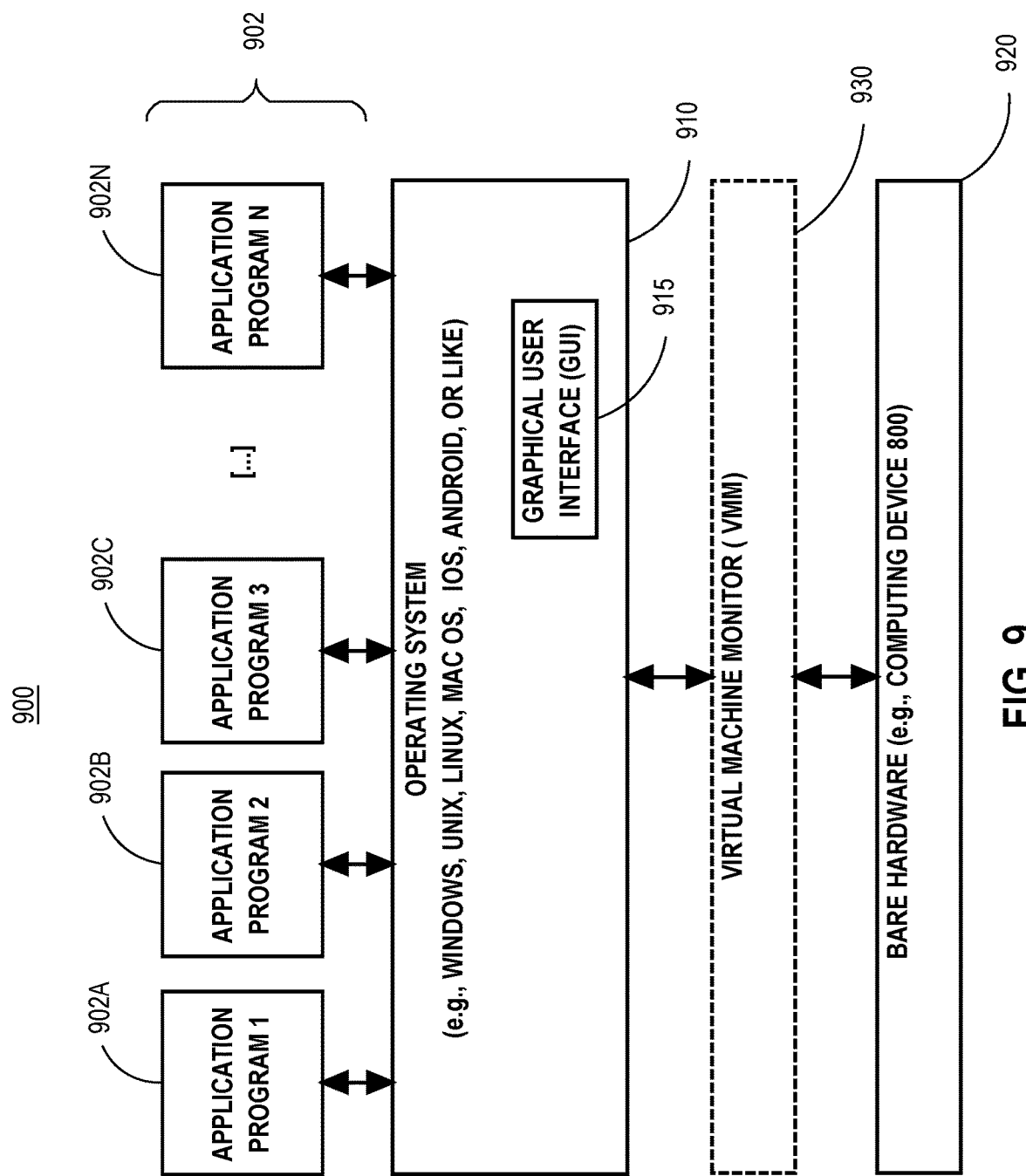
FIG. 9 depicts a software system for controlling the operation of the computer system.

FIG. 9 is a block diagram of a software system 900 that may be employed for controlling the operation of computer system 800. Software system 900 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 900 is provided for directing the operation of computer system 800. Software system 900, which may be stored in system memory (RAM) 806 and on fixed storage (e.g., hard disk or flash memory) 810, includes a kernel or operating system (OS) 910.

The OS 910 manages low-level aspects of computer operation, including managing execution of processes, memory allocation, file input and output (I/O), and device I/O. One or more application programs, represented as 902A, 902B, 902C . . . 902N, may be "loaded" (e.g., transferred from fixed storage 810 into memory 806) for execution by the system 800. The applications or other software intended for use on system 800 may also be stored as a set of downloadable computer-executable instructions, for example, for downloading and installation from an Internet location (e.g., a Web server, an app store, or other online service).

Software system 900 includes a graphical user interface (GUI) 915, for receiving user commands and data in a graphical (e.g., "point-and-click" or "touch gesture") fashion. These inputs, in turn, may be acted upon by the system 900 in accordance with instructions from operating system 910 and/or application(s) 902. The GUI 915 also serves to display the results of operation from the OS 910 and application(s) 902, whereupon the user may supply additional inputs or terminate the session (e.g., log off).

OS 910 can execute directly on the bare hardware 920 (e.g., processor(s) 804) of system 900. Alternatively, a hypervisor or virtual machine monitor (VMM) 930 may be interposed between the bare hardware 920 and the OS 910. In this configuration, VMM 930 acts as a software "cushion" or virtualization layer between the OS 910 and the bare hardware 920 of the system 800.

VMM 930 instantiates and runs one or more virtual machine instances ("guest machines"). Each guest machine comprises a "guest" operating system, such as OS 910, and one or more applications, such as application(s) 902, designed to execute on the guest operating system. The VMM 930 presents the guest operating systems with a virtual operating platform and manages the execution of the guest operating systems.

In some instances, the VMM 930 may allow a guest operating system to run as if it is running on the bare hardware 920 of system 800 directly. In these instances, the same version of the guest operating system configured to execute on the bare hardware 920 directly may also execute on VMM 930 without modification or reconfiguration. In other words, VMM 930 may provide full hardware and CPU virtualization to a guest operating system in some instances.

In other instances, a guest operating system may be specially designed or configured to execute on VMM 930 for efficiency. In these instances, the guest operating system is "aware" that it executes on a virtual machine monitor. In other words, VMM 930 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
    storing a join zone map comprising entries that describe data resulting from a join relationship between a first key column of a first table and a second key column of a second table, said first key column including first key column values and said second key column including second key column values;
    wherein said first table comprises a dimension column that includes dimension column values;
    wherein each entry of said join zone map:
    corresponds to a respective zone comprising contiguous data blocks for storing a plurality of rows, said respective zone corresponding to one or more second key column values of said second key column stored in said respective zone;
    includes a respective dimension value range of one or more dimension column values that correspond, based on said join relationship, to said one or more second key column values of said second key column stored in said respective zone, said respective dimension value range comprising:
    a respective maximum dimension value of said one or more dimension column values,
    a respective minimum dimension value of said one or more dimension column values;
    includes a respective anti-join attribute value indicating whether any of said one or more second key column values in said respective zone are non-null and fail to match any of said first key column values;
    storing a new dimension column value in said dimension column;
    if said new dimension column value is associated with a new first key column value, including, in a set of candidate entries to be marked as stale, any entry in said join zone map having an anti join attribute value indicating that a second key column value is non-null and fails to match any of said first key column values,
    wherein said method is performed by one or more computing devices.

2. The method of claim 1, further comprising excluding, from said set of candidate entries to be marked as stale, any entry in said join zone map having a dimension value range that includes said new dimension column value.

3. The method of claim 1, further comprising, if said new dimension column value replaces an old dimension column value in said dimension column, including, in a set of candidate entries to be marked as stale, any entry in said join zone map having a dimension value range that includes said old dimension column value.

4. The method of claim 3, further comprising excluding, from said set of candidate entries to be marked as stale, any entry in said join zone map having a dimension value range that includes said new dimension column value.

5. The method of claim 3, further comprising marking as potentially stale said any entry in said join zone map having a dimension value range that includes said old dimension column value.

6. The method of claim 1, further comprising marking as potentially stale said any entry in said join zone map having an anti join attribute value indicating that a second key column value is non-null and fails to match any of said first key column values.

7. The method of claim 1, further comprising recomputing one or more dimension value ranges corresponding to one or more stale or potentially stale entries of said set of candidate entries.

8. The method of claim 7, wherein recomputing said one or more dimension value ranges comprises, instead of joining said first table with said second table in its entirety, joining said first table with one or more zones of said second table that correspond to said one or more stale or potentially stale entries.

9. The method of claim 1, wherein said each entry of said join zone map further comprises a respective indication of whether said respective dimension value range was recomputed concurrently with modification of a dimension column value in said respective zone.

10. The method of claim 9, further comprising, when said modification is committed, marking stale or potentially stale any entry having an indication that a dimension value range was recomputed concurrently with said modification.

11. One or more non-transitory storage media storing a set of instructions which, when executed by one or more computing devices, cause:
    storing a join zone map comprising entries that describe data resulting from a join relationship between a first key column of a first table and a second key column of a second table, said first key column including first key column values and said second key column including second key column values;
    wherein said first table comprises a dimension column that includes dimension column values;
    wherein each entry of said join zone map:
    corresponds to a respective zone comprising contiguous data blocks for storing a plurality of rows, said respective zone corresponding to one or more second key column values of said second key column stored in said respective zone;

includes a respective dimension value range of one or more dimension column values that correspond, based on said join relationship, to said one or more second key column values of said second key column stored in said respective zone, said respective dimension value range comprising:

a respective maximum dimension value of said one or more dimension column values, a respective minimum dimension value of said one or more dimension column values;

includes a respective anti-join attribute value indicating whether any of said one or more second key column values in said respective zone are non-null and fail to match any of said first key column values;

storing a new dimension column value in said dimension column;

if said new dimension column value is associated with a new first key column value, including, in a set of candidate entries to be marked as stale, any entry in said join zone map having an anti join attribute value indicating that a second key column value fails to match any of said first key column values.

12. The one or more non-transitory storage media of claim 11, wherein said set of instructions further comprises instructions, which when executed by said one or more computing devices, cause excluding, from said set of candidate entries to be marked as stale, any entry in said join zone map having a dimension value range that includes said new dimension column value.

13. The one or more non-transitory storage media of claim 11, wherein said set of instructions further comprises instructions, which when executed by said one or more computing devices, cause, if said new dimension column value replaces an old dimension column value in said dimension column, including, in a set of candidate entries to be marked as stale, any entry in said join zone map having a dimension value range that includes said old dimension column value.

14. The one or more non-transitory storage media of claim 13, wherein said set of instructions further comprises instructions, which when executed by said one or more computing devices, cause excluding, from said set of candidate entries to be marked as stale, any entry in said join zone map having a dimension value range that includes said new dimension column value.

15. The one or more non-transitory storage media of claim 13, wherein said set of instructions further comprises instructions, which when executed by said one or more computing devices, cause marking as potentially stale said any entry in said join zone map having a dimension value range that includes said old dimension column value.

16. The one or more non-transitory storage media of claim 11, wherein said set of instructions further comprises instructions, which when executed by said one or more computing devices, cause marking as potentially stale said any entry in said join zone map having an anti join attribute value indicating that a second key column value is non-null and fails to match any of said first key column values.

17. The one or more non-transitory storage media of claim 11, wherein said set of instructions further comprises instructions, which when executed by said one or more computing devices, cause recomputing one or more dimension value ranges corresponding to one or more stale or potentially stale entries of said set of candidate entries.

18. The one or more non-transitory storage media of claim 17, wherein recomputing said one or more dimension value ranges comprises, instead of joining said first table with said second table in its entirety, joining said first table with one or more zones of said second table that correspond to said one or more stale or potentially stale entries.

19. The one or more non-transitory storage media of claim 11, wherein said each entry of said join zone map further comprises a respective indication of whether said respective dimension value range was recomputed concurrently with modification of a dimension column value in said respective zone.

20. The one or more non-transitory storage media of claim 19, wherein said set of instructions further comprises instructions, which when executed by said one or more computing devices, cause, when said modification is committed, marking stale or potentially stale any entry having an indication that a dimension value range was recomputed concurrently with said modification.

* * * * *

UNITED STATES PATENT AND TRADEMARK OFFICE
CERTIFICATE OF CORRECTION

PATENT NO. : 10,776,363 B2  
APPLICATION NO. : 15/638226  
DATED : September 15, 2020  
INVENTOR(S) : Ziauddin et al.

Page 1 of 1

It is certified that error appears in the above-identified patent and that said Letters Patent is hereby corrected as shown below:

In the Specification

In Column 6, Line 11, delete "anti join" and insert -- anti-join --, therefor.

In Column 6, Line 31, delete "anti join" and insert -- anti-join --, therefor.

In Column 8, Line 11, delete "anti join" and insert -- anti-join --, therefor.

In Column 8, Line 47, delete "anti join" and insert -- anti-join --, therefor.

In Column 9, Line 19, delete "anti join" and insert -- anti-join --, therefor.

In Column 10, Line 55, delete "anti join" and insert -- anti-join --, therefor.

In Column 12, Line 30, delete "anti join" and insert -- anti-join --, therefor.

In Column 12, Line 49, delete "anti join" and insert -- anti-join --, therefor.

In the Claims

In Column 18, Line 6, in Claim 1, delete "anti join" and insert -- anti-join --, therefor.

In Column 18, Line 32, in Claim 6, delete "anti join" and insert -- anti-join --, therefor.

In Column 19, Line 23, in Claim 11, delete "anti join" and insert -- anti-join --, therefor.

In Column 20, Line 15, in Claim 16, delete "anti join" and insert -- anti-join --, therefor.

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*